(12) United States Patent
Iwamura

(10) Patent No.: US 6,853,844 B2
(45) Date of Patent: Feb. 8, 2005

(54) TRANSMISSION POWER CONTROL METHOD AND MOBILE STATION

(75) Inventor: Mikio Iwamura, Zushi (JP)

(73) Assignee: NTT DoCoMo, Inc., Tokyo (JP)

( * ) Notice: Subject to any disclaimer, the term of this patent is extended or adjusted under 35 U.S.C. 154(b) by 305 days.

(21) Appl. No.: 10/259,304

(22) Filed: Sep. 30, 2002

(65) Prior Publication Data

US 2003/0064682 A1 Apr. 3, 2003

(30) Foreign Application Priority Data

Sep. 28, 2001 (JP) ........................................ 2001-304273

(51) Int. Cl.[7] ............................. H04Q 7/20; H04B 7/00
(52) U.S. Cl. ...................... 455/442; 455/436; 455/522; 455/226.2; 455/69; 370/331; 370/332
(58) Field of Search ................................. 455/436, 437, 455/438, 439, 442, 443, 444, 522, 69, 68, 226.2, 226.3, 13.4; 370/331, 332, 335, 342

(56) References Cited

U.S. PATENT DOCUMENTS

| | | | | | |
|---|---|---|---|---|---|
| 5,771,451 | A | * | 6/1998 | Takai et al. ................. | 455/442 |
| 5,845,212 | A | * | 12/1998 | Tanaka ........................ | 455/437 |
| 6,263,205 | B1 | * | 7/2001 | Yamaura et al. ............ | 455/442 |
| 6,539,226 | B1 | * | 3/2003 | Furukawa et al. .......... | 455/442 |
| 6,650,905 | B1 | * | 11/2003 | Toskala et al. ............. | 455/522 |
| 2002/0115440 | A1 | * | 8/2002 | Hamabe ...................... | 455/442 |

FOREIGN PATENT DOCUMENTS

| | | |
|---|---|---|
| EP | 1 239 689 | 9/2002 |
| WO | WO 99/03291 | 1/1999 |
| WO | WO 02/01893 | 1/2002 |

OTHER PUBLICATIONS

3rd Generation Partnership Project; Technical Specification Group Radio Access Network; DSCH power control improvenent in soft handover (Release 4), XP-002246941, pp. 1–13, "3GPP TR 25.841 V4.1.0", Mar. 31, 2001.
Derwent Publications, AN 2001-251276, JP 2001-045539, Feb. 16, 2001.
Derwent Publications, AN 1993-341900, JP 5-252100, Sep. 28, 1993.

* cited by examiner

Primary Examiner—Duc M. Nguyen
(74) Attorney, Agent, or Firm—Oblon, Spivak, McClelland, Maier & Neustadt, P.C.

(57) ABSTRACT

An object of the present invention is to prevent communication quality from being degraded when a mobile station $30_2$ is conducting DHO using a first signal, by means of simple control without greatly altering the scale of the apparatus. A mobile station $30_2$ according to the present invention receives signals from a first base station $10_1$ and a second base station $10_2$ during DHO. The mobile station $30_2$ includes reception means 32 for receiving a first signal DCH and a second signal SCH from the first base station $10_1$ and receiving a third signal DCH from the second base station $10_2$, reception quality measuring means 37 for measuring a reception quality of the first signal DCH or the second signal SCH, control command generation means 39 for generating a control command for controlling the transmission power of the signals from the first base station $10_1$ and the second base station $10_2$ on the basis of a result of the measurement of the reception quality, and transmission means 32, 41 and 42 for transmitting the control command to the first base station $10_1$ and the second base station $10_2$.

10 Claims, 9 Drawing Sheets

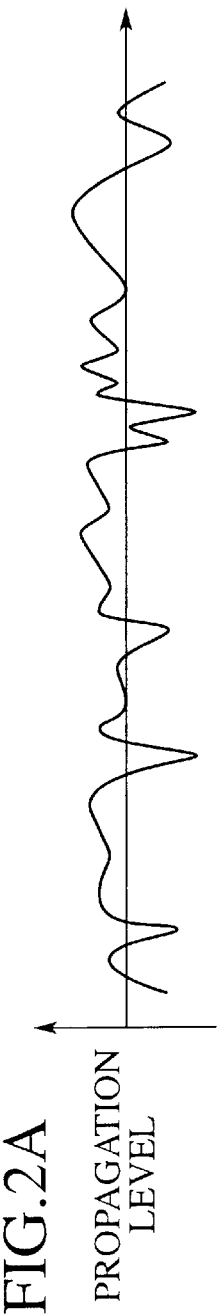
FIG.2A PROPAGATION LEVEL
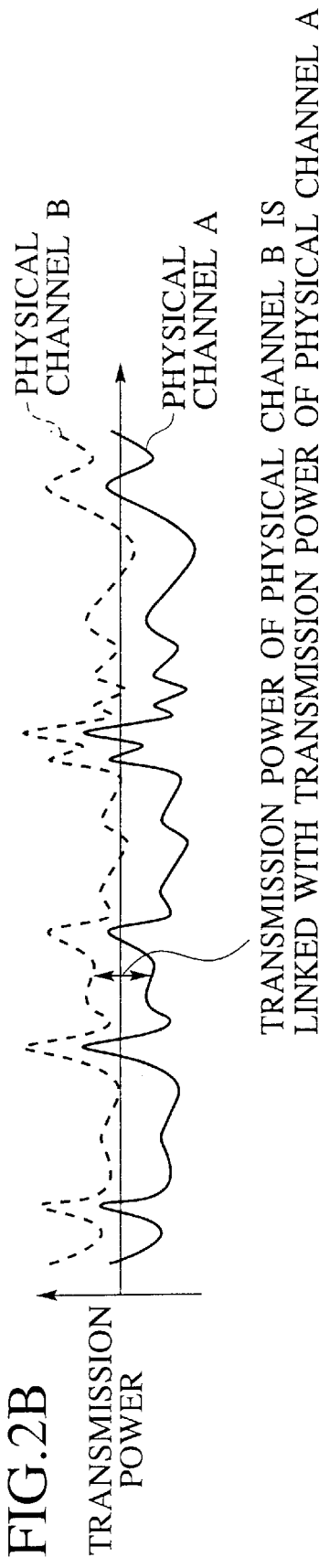
FIG.2B TRANSMISSION POWER
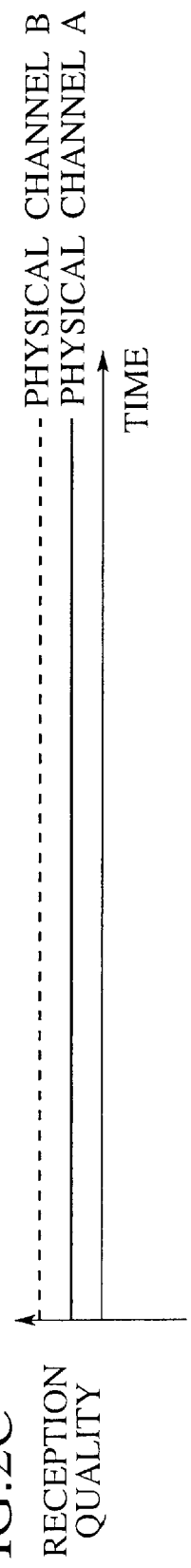
FIG.2C RECEPTION QUALITY

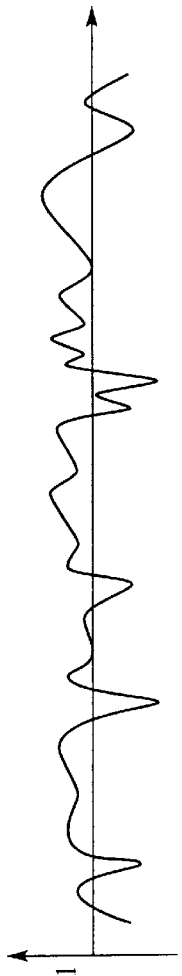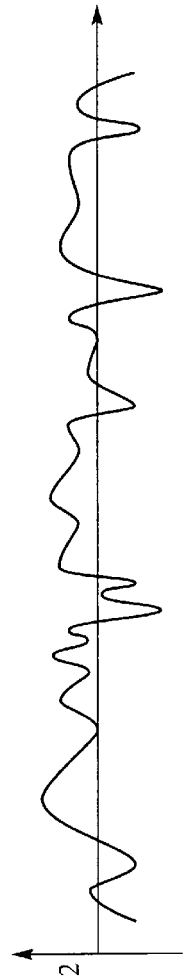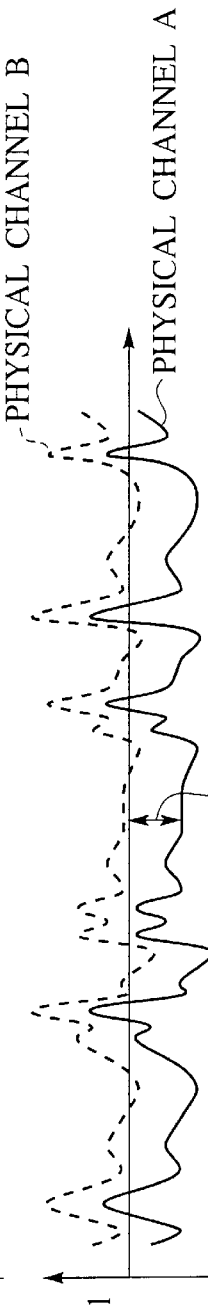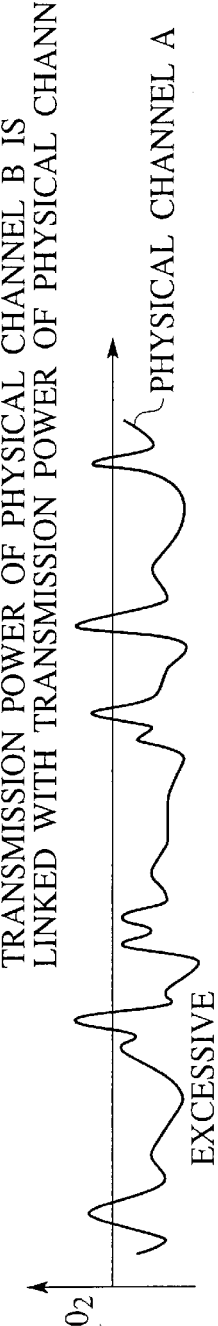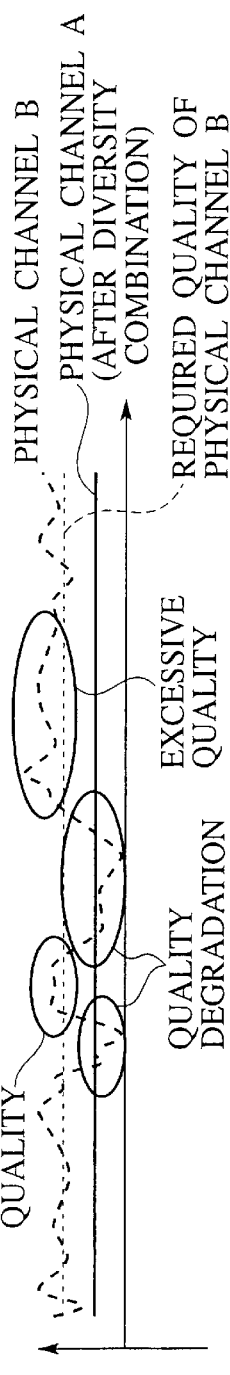

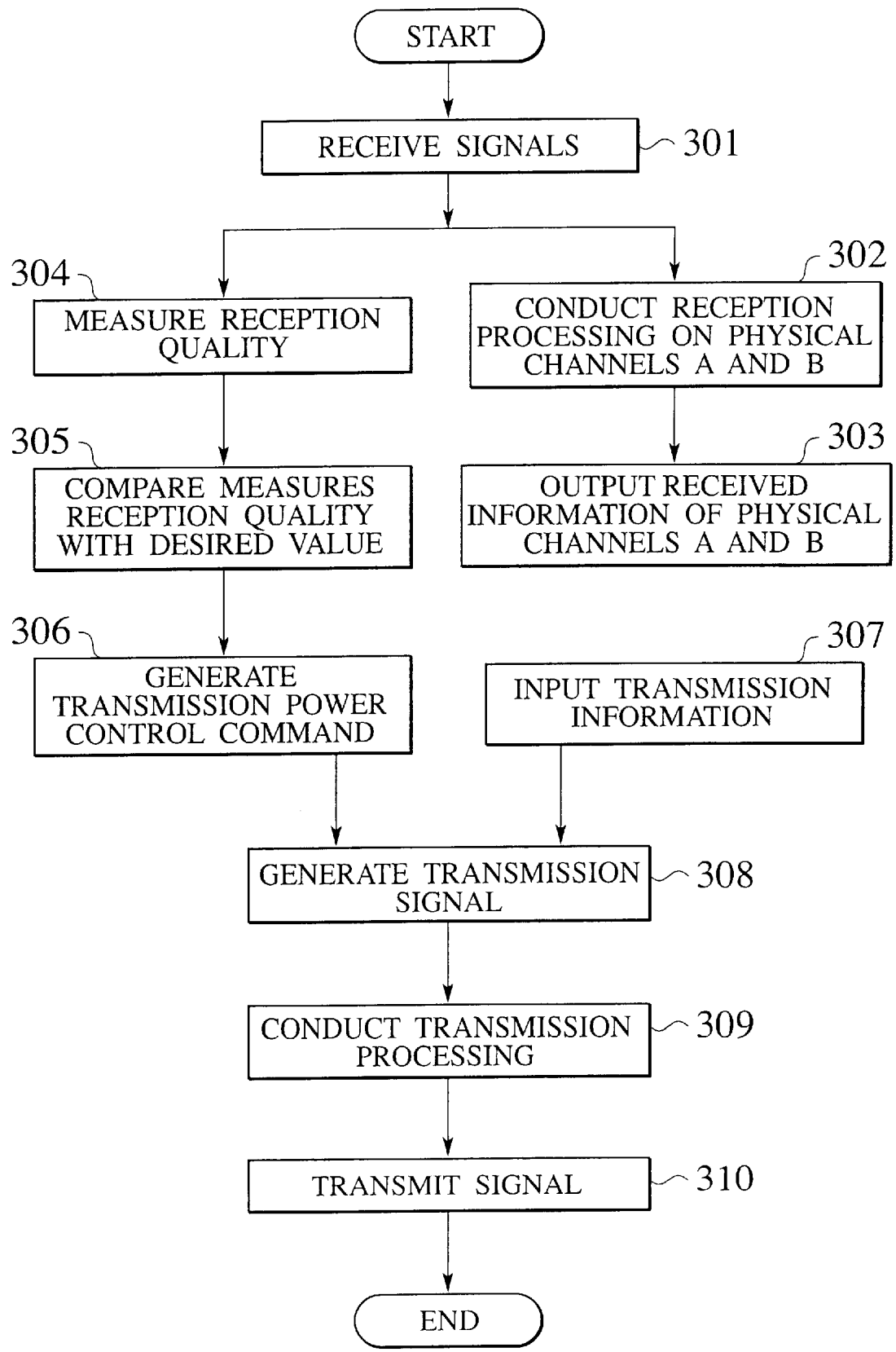

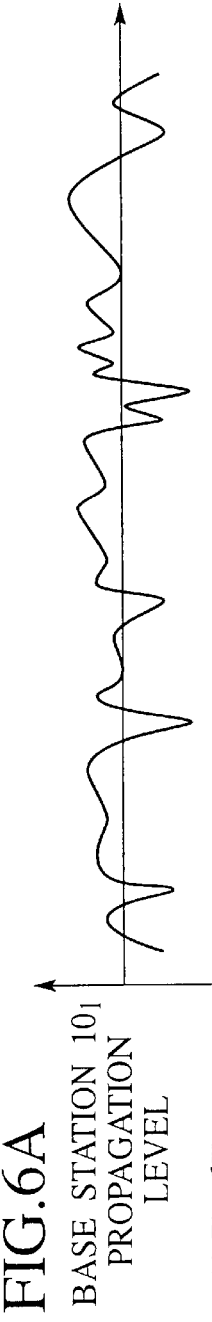
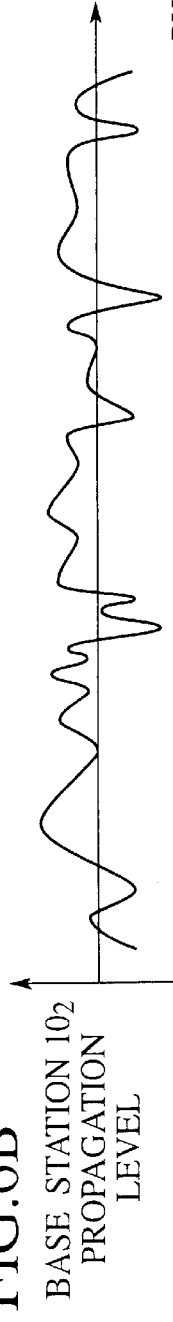
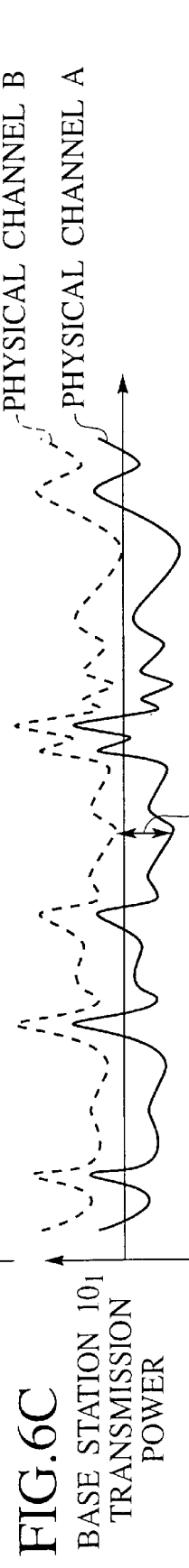
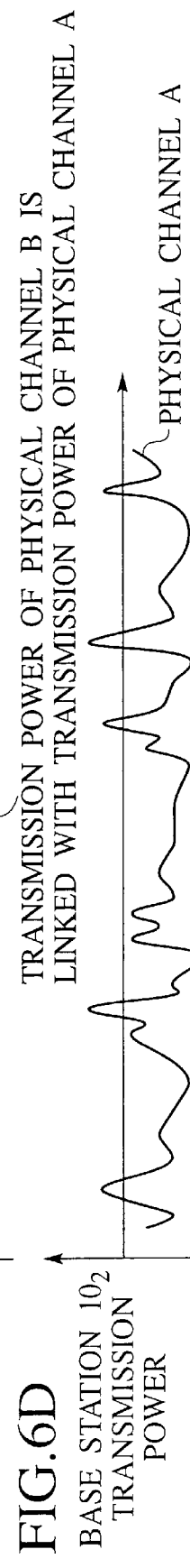
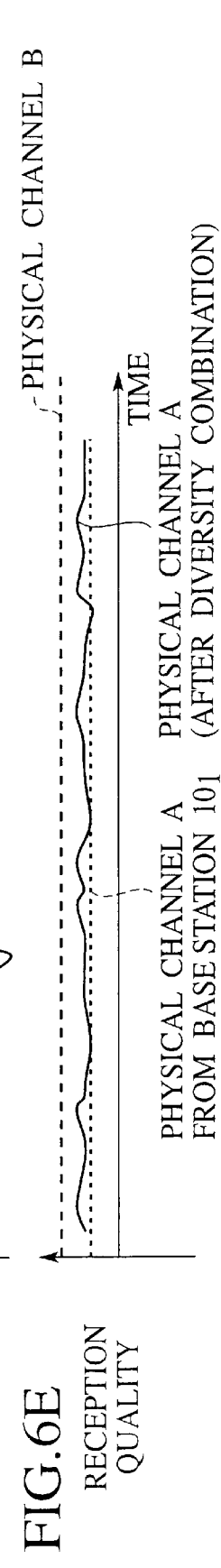

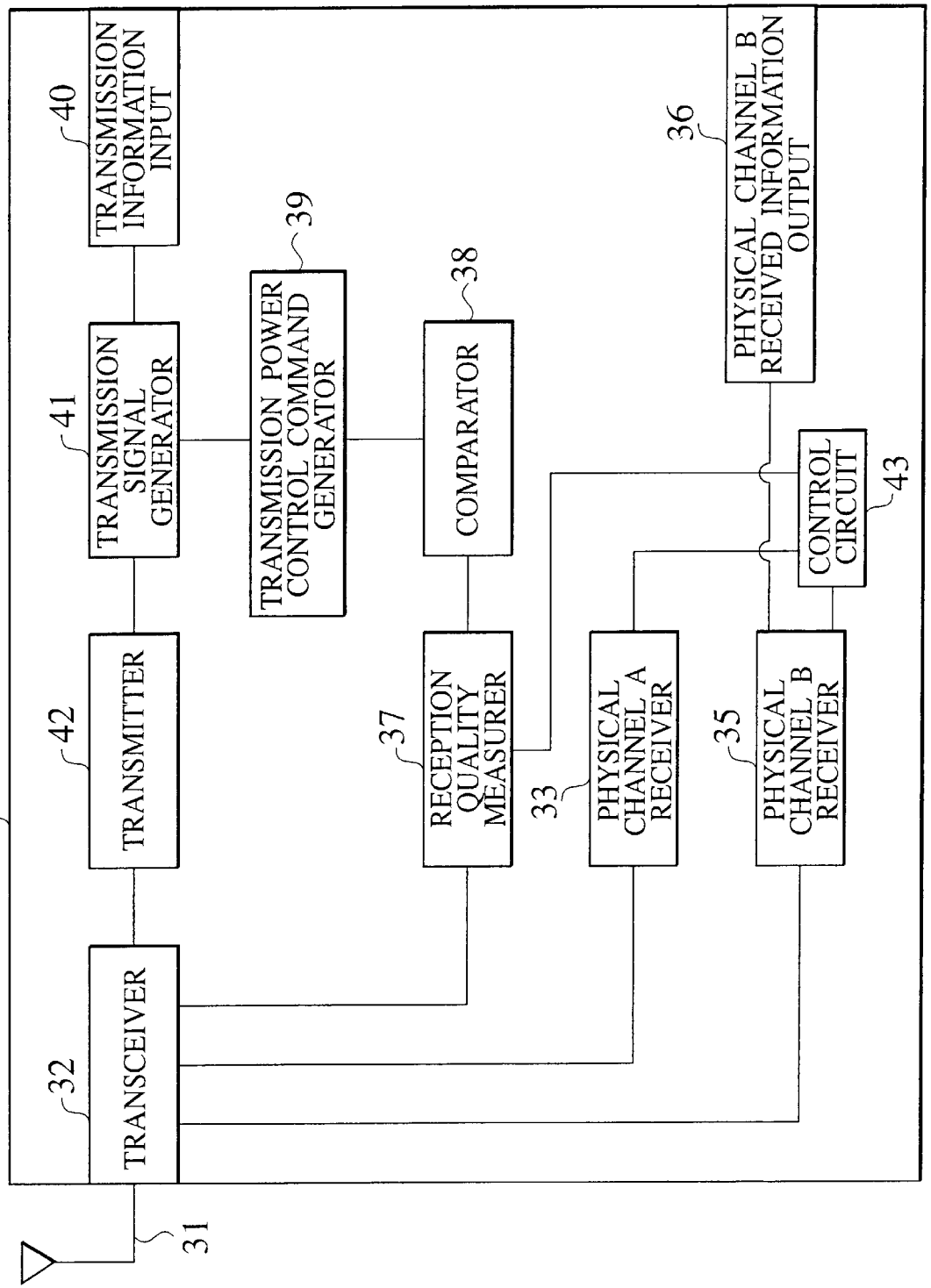

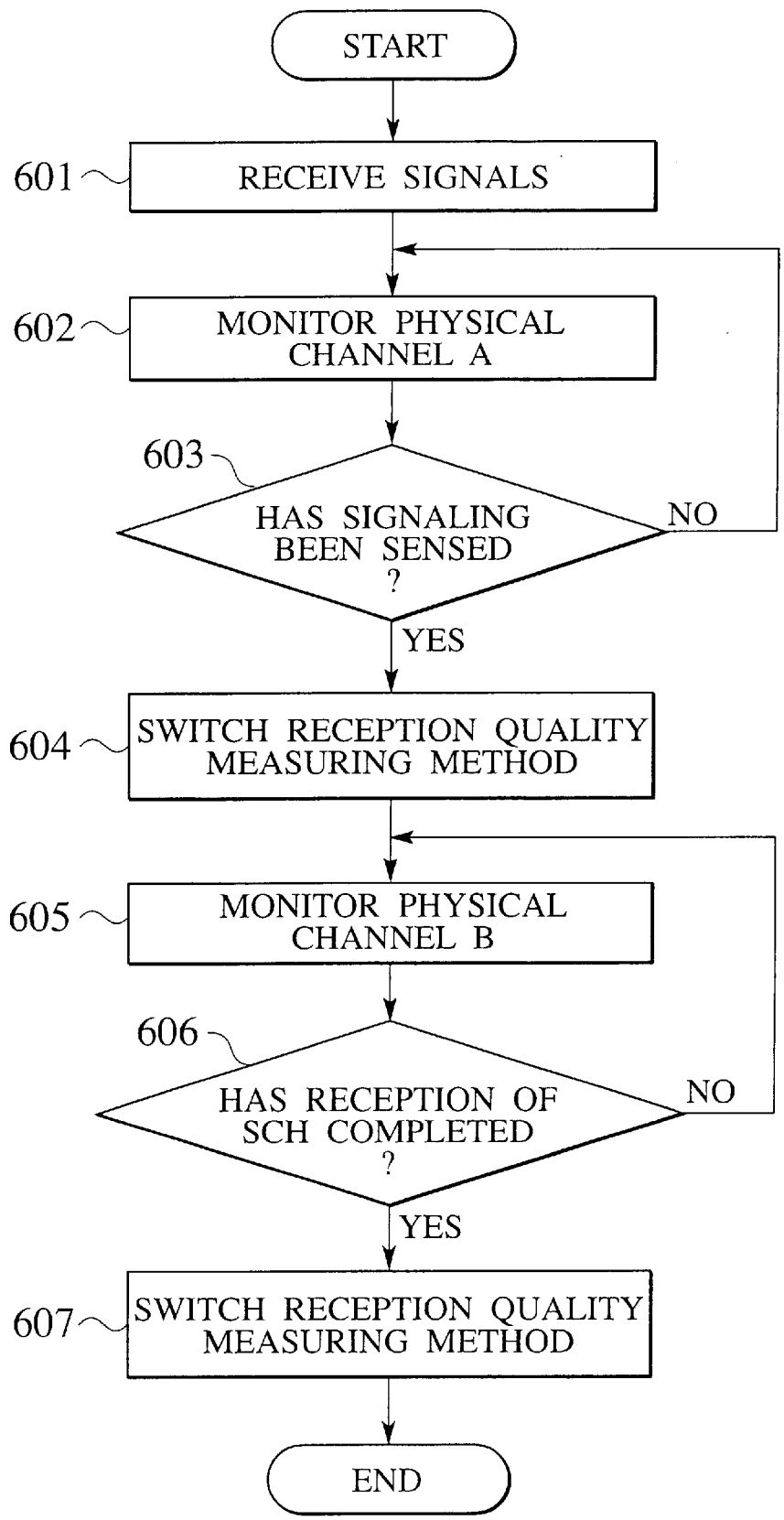

FIG.9A BASE STATION $10_1$ PROPAGATION LEVEL

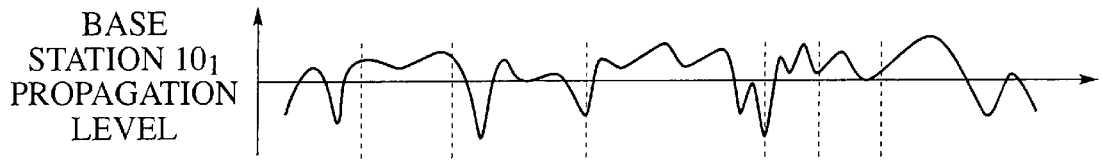

FIG.9B BASE STATION $10_2$ PROPAGATION LEVEL

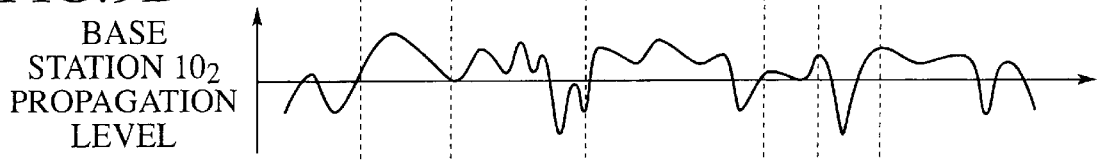

FIG.9C SCH TRANSMISSION TO MOBILE STATION $30_2$

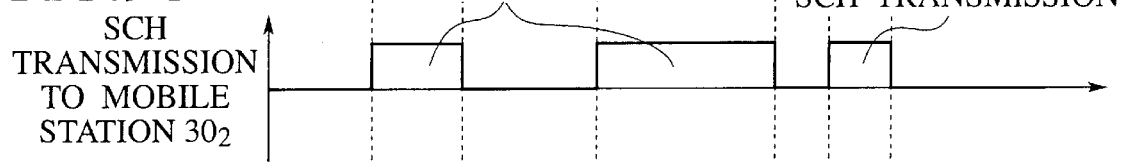

SCH TRANSMISSION    SCH TRANSMISSION

FIG.9D BASE STATION $10_1$ TRANSMISSION POWER

SCH

DCH

TRANSMISSION POWER OF SCH IS LINKED WITH TRANSMISSION POWER OF DCH

FIG.9E BASE STATION $10_2$ TRANSMISSION POWER

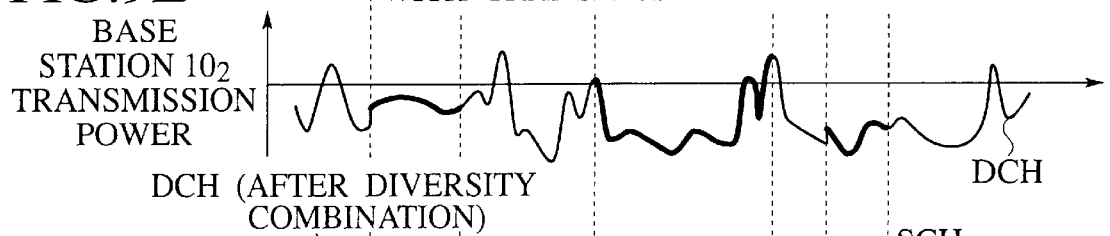

DCH

DCH (AFTER DIVERSITY COMBINATION)

FIG.9F RECEPTION SIR

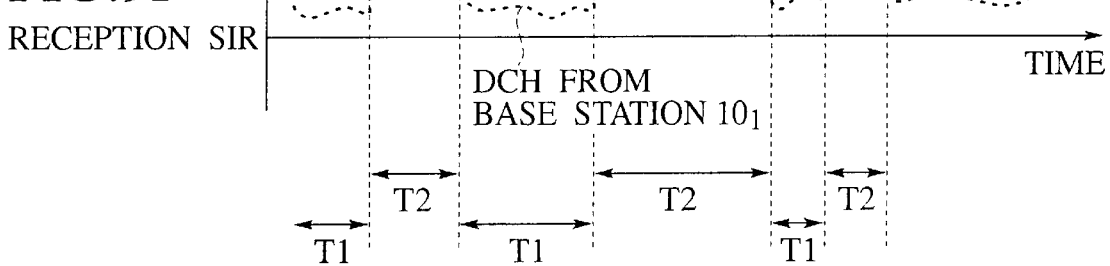

SCH

DCH FROM BASE STATION $10_1$

TIME

T1  T2  T1  T2  T1  T2

TRANSMISSION POWER CONTROL METHOD AND MOBILE STATION

CROSS REFERENCE TO RELATED APPLICATIONS

This application is based upon and claims the benefit of priority from the prior Japanese Patent Applications No. P2001-304273, filed on Sep. 28, 2001, the entire contents of which are incorporated herein by reference.

BACKGROUND OF THE INVENTION

1. Field of the Invention

The present invention relates to a transmission power control method for conducting transmission power control of a downlink while a mobile station is effecting a diversity handover, and a mobile station suitable for use with this method.

2. Description of the Related Art

FIG. 1 shows a configuration of a mobile communication system such as a portable telephone system currently in wide use. In the mobile communication system shown in FIG. 1, the whole service area is divided into comparatively small radio zones called "cells 1 to 5". Such a mobile communication system includes a plurality of base stations $10_1$ to $10_5$ respectively covering the cells 1 to 5, and mobile stations $30_1$ to $30_5$ which set radio channels and communicate with the base stations $10_1$ to $10_5$ respectively.

In such a mobile communication system, radio waves transmitted from the base stations $10_1$ to $10_5$ are attenuated when they are propagated through space, and they arrive at the mobile stations $30_1$ to $30_5$. The radio waves are influenced in the degree of attenuation not only by the distances between the base stations $10_1$ to $10_5$ and the mobile stations $30_1$ to $30_5$, but also by the configuration of the land and buildings around the base stations $10_1$ to $10_5$ and the mobile stations $30_1$ to $30_5$.

When the "transmission power of radio waves" (hereafter referred to as transmission power) from the base stations $10_1$ to $10_5$ is constant, the "reception power of radio waves" (hereafter referred to as reception power) of the mobile stations $30_1$ to $30_5$ varies violently according to the movement of the mobile stations $30_1$ to $30_5$. Such variation is called "fading".

Conventionally, as a technique for keeping the communication quality constant even in an environment with fading, there is known a transmission power control method of a feedback type (conventional first transmission power control method) based upon the "reception quality of radio waves" (hereafter referred to as reception quality).

To be more concrete, so as to track the variation of the propagation level caused by fading or the like, in the conventional first transmission power control method, the reception side (such as a mobile station) measures the reception quality, compares the measured reception quality with a desired value, and feeds back the comparison result to the transmission side (such as a base station) with a sufficiently short period of radio frames, time slots, or the like, and the transmission side adjusts the transmission power on the basis of the comparison result.

The first transmission power control method not only mitigates the influence of fading and keeps the reception quality constant, but also is effective in mitigating the variation in the reception quality caused by the location of the mobile station $30_1$ to $30_5$ in the service area, suppressing the transmission power to the minimum, and improving power utilization efficiency.

As a reference for the reception quality, a "signal to interference power ratio" (SIR), "reception power", and a "result of error detection using CRC" (cyclic redundancy check) can be utilized.

Typically, in the mobile communication system, each of the mobile stations $30_1$ to $30_5$ suitably switches base stations $10_1$ to $10_5$ to which a radio channel is established, as it moves. This operation is called "handover".

As the "handover", the "hard handover (HHO) scheme" and the "diversity handover (DHO) scheme" have been considered. In the hard handover (HHO) scheme, a mobile station 30 moving across a boundary between the cells 1 to 5 instantaneously switches the base stations $10_1$ to $10_5$ to which a radio channel is established, and a radio channel is constantly established between the mobile station 30 and a single base station 10. In the diversity handover (DHO) scheme, a mobile station 30 moving across a boundary between the cells 1 to 5 establishes a radio channel between a new base station $10_2$ and the mobile station 30 before opening a radio channel between a base station $10_1$ under communication and the mobile station 30 and thus the mobile station 30 temporarily communicates with a plurality of base stations $10_1$ and $10_2$ at the same time.

The DHO scheme has an advantage over the HHO scheme that interruption is not caused at the time of switching of the base stations $10_1$ to $10_5$.

If the mobile station 30 is located at an end of the cells 1 to 5 and the mobile station 30 communicates with a single base station 10, then the base station 10 needs large transmission power in order to keep the reception quality constant, which causes problems.

In such a case, there is a possibility that sufficient reception power capable of coping with a fall in the propagation level caused by fading cannot be obtained in the mobile station 30.

If the DHO scheme is applied, however, then the mobile station 30 can simultaneously receive radio waves (signals) transmitted from a plurality of base stations 10 and combine them. As a result, the problem can be solved.

Fading differs for each base station 10. By using the DHO scheme, therefore, falls in the propagation level caused by fading can be compensated for between a plurality of base stations 10. Thus there can be obtained effects such as the stabilization of communication quality and reduction of transmission power to the base station 10.

For the transmission scheme in the mobile communication system, there is a "dedicated scheme" and a "shared scheme". In the "dedicated scheme", a dedicated channel (DCH) is established for each mobile station 30. In the "shared scheme", one (or more) shared channels (SCH) having a large transmission capacity is prepared and a plurality of mobile stations 30 share the "SCH" in a time division form using scheduling.

The "dedicated scheme" has an advantage in that the transmission rate for each mobile station 30 is ensured. However, the "dedicated scheme" has a drawback in that the transmission rate for each mobile station 30 is kept down to a low value and as many hardware resources (radio channels) as the number of the mobile stations 30 that can communicate simultaneously are needed.

On the other hand, the "shared scheme" has a drawback in that the transmission rate for each mobile station 30 is not ensured. However, the "shared scheme" has an advantage in that a high transmission rate for each mobile station 30 can be achieved when the number of the mobile stations 30 that communicate simultaneously is small, and the required hardware resource (radio channel) is only one "SCH".

The "dedicated scheme" is suitable for communication that varies slightly in transmitted information content with time, makes strong demands regarding transmission delay, and always needs a constant communication band, such as audio communication.

On the other hand, the "shared scheme" is suitable for intermittent communication whose transmitted information content varies greatly with time and comparatively does not make strong demands regarding transmission delay.

If information directed to a specific mobile station 30 exists on the SCH in the shared scheme, then the mobile station 30 is "notified" (signaled) to that effect. The signaling may be conducted on a dedicated DCH established for each mobile station 30, or may be conducted on an established SCH for signaling.

Information transmitted on the SCH for a specific mobile station 30 might become intermittent, because a plurality of mobile stations 30 share the SCH. If the conventional first transmission power control method is applied using the reception quality of the SCH when controlling the transmission power of the SCH, then the transmission power control becomes intermittent and trouble is caused, resulting in a problem.

In order to solve this problem, the "second transmission power control method" can be used. During an interval having a possibility that an SCH will be transmitted to a mobile station 30, a DCH is established incidentally for the mobile station 30 and the conventional first transmission power control method is applied continuously by using the reception quality of the DCH. If there is transmission of an SCH, then the transmission power of the SCH is linked with the transmission power of the DCH with a certain offset.

According to the second transmission power control method, the transmission power of the SCH can be controlled indirectly by linking the transmission power of the SCH directed to the mobile station 30 with the transmission power of the DCH directed to the mobile station 30 as shown in FIG. 2.

In FIG. 2, the transmission power (FIG. 2B) of a "DCH (physical channel A)" has a shape obtained by nearly inverting vertically that of a variation of a propagation level (FIG. 2A) caused by fading or the like. As a result, the "DCH (physical channel A)" has a constant reception quality FIG. 2C.

In other words, in FIG. 2, the variation (FIG. 2A) of the propagation level of the "SCH (physical channel B)" is similar to the "variation of the propagation level of the "DCH (physical channel A)". If the transmission power (FIG. 2B) of the "SCH (physical channel B)" is linked with the transmission power (FIG. 2B) of the "DCH (physical channel A)", then the reception quality (FIG. 2C) of the "SCH (physical channel B)" also becomes constant.

Such a conventional second transmission power control method can also cope with a multi-call in which the same mobile station 30 conducts a plurality of communication operations, such as the case where the mobile station 30 receives electronic mail while the mobile station 30 is conducting audio communication on the DCH.

When application of the DHO scheme is considered, it becomes necessary in the shared scheme to adjust scheduling of transmission timing between the base stations $10_1$ to $10_5$ and consequently the control load of the network increases.

Furthermore, in a mobile communication system in which the number of base stations $10_1$ to $10_5$ is large and the cells 1 to 5 are continuous, it is difficult for the mobile station 30 to adjust the scheduling of the timing of transmission to the same mobile station 30 between a plurality of base stations $10_1$ to $10_5$.

Typically in the shared system, therefore, it is simpler to apply the HHO scheme.

However, it is effective to apply the DHO scheme to the DCH in expectation of no interruption occurring at the time of handover, the stabilization of quality of the DCH, and the reduction of the transmission power required.

In such a case, one of the base stations 10 transmitting the DHOs may transmit an SCH to a specific mobile station 30 that is conducting DHO using a plurality of DCHs.

When the mobile station 30 is conducting DHO using specific physical channels A, i.e., first signals (DCHs in the above described example), there is a method of simultaneously communicating by using a different physical channel B, i.e., a second signal (SCH in the above described example).

As in the above described example of DCH and SCH, a base station group B (such as $30_1$) transmitting the physical channel B is a subset of a base station group A (such as $30_1$ to $30_5$) transmitting the physical channels A. However, the base station group A does not coincide with the base station group B in some cases.

According to the conventional second transmission power control method, transmission power of the physical channel A and transmission power of the physical channel B are simultaneously controlled in such a case, on the basis of a result of a reception quality measurement of the physical channel A obtained after a diversity combination.

In other words, in the conventional second transmission power control method, the transmission power of the physical channel A is controlled on the basis of the result of the reception quality measurement of the physical channel A obtained after the diversity combination, and the transmission power of the physical channel B is controlled indirectly by linking with the transmission power of the physical channel A.

In the conventional second transmission power control method, the reception quality of the physical channel A obtained after the diversity combination is kept constant. However, the reception quality of the physical channel B cannot be kept constant. An example is shown in FIG. 3.

FIG. 3 shows an example of the case where the base station $10_1$ transmits the physical channel B (SCH) to the mobile station $30_2$, which is conducting DHO between two base stations, i.e., the base station $10_1$ and the base station $10_2$, using the physical channels A (DCHs) (see FIG. 1).

The propagation level of the base station $10_1$ (FIG. 3A) and the propagation level of the base station $10_2$ (FIG. 3B) are varied by independent fading phenomena, respectively.

The mobile station $30_2$ conducts a diversity combination on received signals of the "physical channels A (DCHs)" transmitted from the base stations $10_1$ and $10_2$, and controls the transmission power of the "physical channels A (DCHs)" of the base stations $10_1$ and $10_2$ so as to keep the received signal quality obtained after the diversity combination constant (see FIG. 3E).

The "physical channel B (SCH)" is transmitted only from the base station $10_1$. The transmission power of the "physical channel B (SCH)" is controlled so as to be linked with the transmission power of the "physical channel A (DCH)"

of the base station $10_1$ controlled as described above (see FIG. 3C and FIG. 3D).

Therefore, the reception quality of the "physical channel B (SCH)" received in the mobile station $30_2$ does not become constant, but varies violently.

In other words, the case where the reception quality of the "physical channel B (SCH)" does not satisfy the "required quality of the physical channel B" frequently occurs, and the communication quality of the "physical channel B (SCH)" is degraded (see FIG. 3E).

Furthermore, there frequently occurs the case where although the reception quality of the "physical channel B (SCH)" satisfies the "required quality of the physical channel B", the reception quality of the "physical channel B (SCH)" is unnecessarily high and the "physical channel B (SCH)" is transmitted with excessive power (i.e., "excessive quality" state). Excessive transmission power lowers the power utilization efficiency in the mobile communication system, and in addition increases interference on the surroundings. Therefore, excessive transmission power lowers the efficiency of the whole mobile communication system.

Thus, the conventional second transmission power control method has a fatal problem in that the reception quality of the "physical channel B (SCH)" is degraded when the mobile station 30 is conducting DHO using the "physical channels A (DCHs)".

Furthermore, there is a problem that the transmission power of the "physical channel B (SCH)" becomes excessive and power utilization efficiency in the mobile communication system is lowered. Furthermore, this results in a problem that excessive transmission power increases interference and lowers the efficiency of the whole mobile communication system.

BRIEF SUMMARY OF THE INVENTION

Therefore, an object of the present invention is to provide a transmission power control method that prevents communication quality degradation of the physical channel A and the physical channel B using a simple control without greatly altering the scale of the apparatus, when the base station group B transmitting the physical channel B is a subset of the base station group A transmitting the physical channels A, but the base station group A does not coincide with the base station group B and the mobile station is conducting DHO using the physical channels A, and to provide a mobile station suitable for the transmission power control method.

In accordance with a first aspect of the present invention, there is provided a transmission power control method for controlling, in a mobile station receiving signals from a first base station and a second base station during a diversity handover, the transmission power of the signals from the first base station and the second base station, the transmission power control method including a first step of receiving a first signal and a second signal from the first base station and receiving a third signal from the second base station, a second step of measuring a reception quality of the first signal or the second signal, a third step of generating a control command for controlling the transmission power of the signals from the first base station and the second base station on the basis of a result of the measurement of the reception quality, and a fourth step of transmitting the control command to the first base station and the second base station.

Preferably, in the first aspect of the present invention, in the first step, the second signal is received intermittently, and in the second step, the reception quality of the first signal or the second signal is measured in an interval during which the second signal is being received, whereas a reception quality of a signal obtained by conducting a diversity combination on the first signal and the third signal is measured in an interval during which the second signal is not being received.

Preferably, in the first aspect of the present invention, there is included a step of monitoring the first signal to determine whether signaling is occurring to notify the mobile station that the second signal is being transmitted, and in the second step it is determined whether an interval is an interval during which the second signal is being received, according to whether the signaling is occurring.

Preferably, in the first aspect of the present invention, in the second step the reception quality is measured with RAKE reception by switching between a finger assignment to the first signal or the second signal and a finger assignment to the first signal and the third signal, according to whether an interval is the interval during which the second signal is being received.

Preferably, in the first aspect of the present invention, the first signal and the third signal are dedicated channels (DCHs) provided for each mobile station, whereas the second signal is a shared channel (SCH) shared by a plurality of mobile stations in a time division form.

In accordance with a second aspect of the present invention, there is provided a mobile station for receiving signals from a first base station and a second base station during a diversity handover, the mobile station including a receiver configured to receive a first signal and a second signal from the first base station and receive a third signal from the second base station, a reception quality measurer configured to measure a reception quality of the first signal or the second signal, a control command generator configured to generate a control command for controlling the transmission power of the signals from the first base station and the second base station on the basis of a result of the measurement of reception quality, and a transmitter configured to transmit the control command to the first base station and the second base station.

Preferably, in the second aspect of the present invention, the receiver receives the second signal intermittently, and the reception quality measurer measures the reception quality of the first signal or the second signal in an interval during which the second signal is being received, whereas the reception quality measurer measures a reception quality of a signal obtained by conducting a diversity combination on the first signal and the third signal in an interval during which the second signal is not being received.

Preferably, in the second aspect of the present invention, there is included a monitor configured to monitor the first signal to determine whether signaling is occurring to notify the mobile station that the second signal is being transmitted, and the reception quality measurer determines whether an interval is the interval during which the second signal is being received, according to whether the signaling is occurring.

Preferably, in the second aspect of the present invention, the reception quality measurer measures the reception quality with RAKE reception by switching between a finger assignment to the first signal or the second signal and a finger assignment to the first signal and the third signal, according to whether an interval is the interval during which the second signal is being received.

Preferably, in the second aspect of the present invention, the first signal and the third signal are dedicated channels (DCHs) provided for each mobile station, whereas the second signal is a shared channel (SCH) shared by a plurality of mobile stations in a time division form.

BRIEF DESCRIPTION OF THE SEVERAL VIEWS OF THE DRAWINGS

FIGS. 2A to 2C is a diagram showing how transmission power is controlled according to a conventional technique;

FIGS. 3A to 3E is a diagram showing how transmission power is controlled according to a conventional technique;

FIG. 5 is a flow chart showing operation of a mobile station according to an embodiment of the present invention;

FIGS. 6A to 6E is a diagram showing how transmission power is controlled according to an embodiment of the present invention;

FIG. 7 is a schematic configuration diagram of a mobile station according to an embodiment of the present invention;

FIG. 8 is a flow chart showing operation of a mobile station according to an embodiment of the present invention; and FIG. 9 is a diagram showing how transmission power is controlled according to an embodiment of the present invention.

DETAILED DESCRIPTION OF THE INVENTION (Configuration of Mobile Station According to First Embodiment of Present Invention)

A configuration of a mobile station according to a first embodiment of the present invention will now be described with reference to the drawings.

Figure 1:
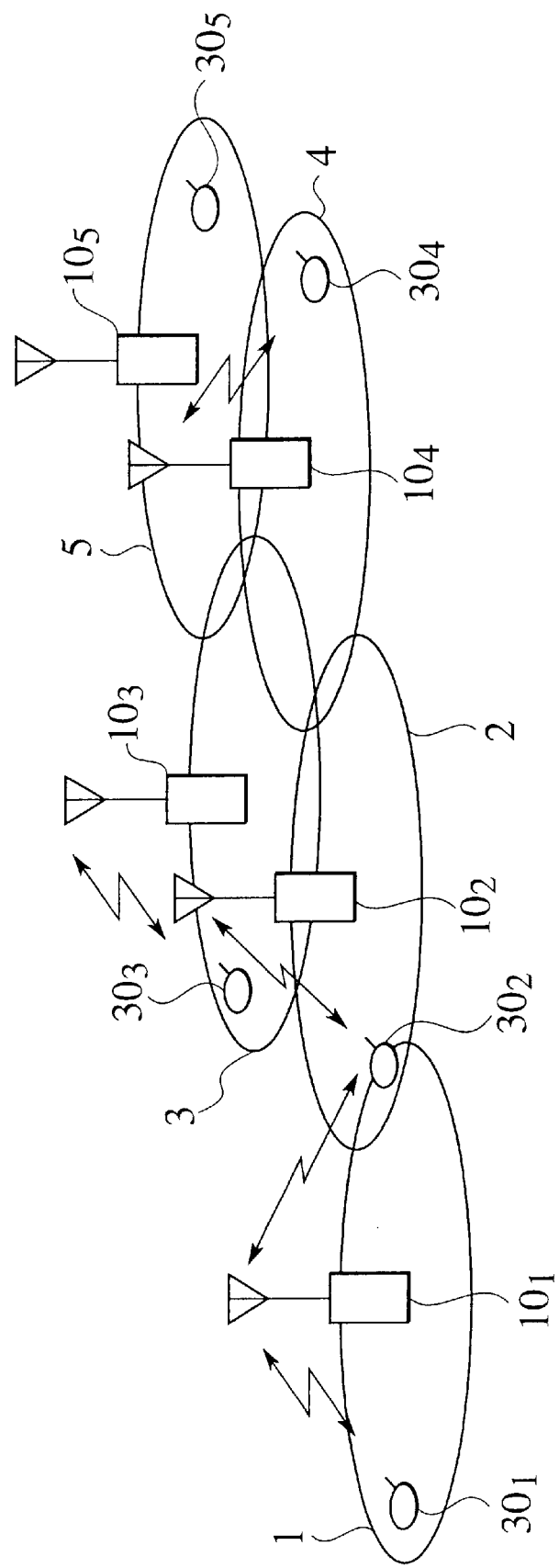
FIG. 1 is a schematic configuration diagram of a mobile communication system according to an embodiment of the present invention.
Figure 4:
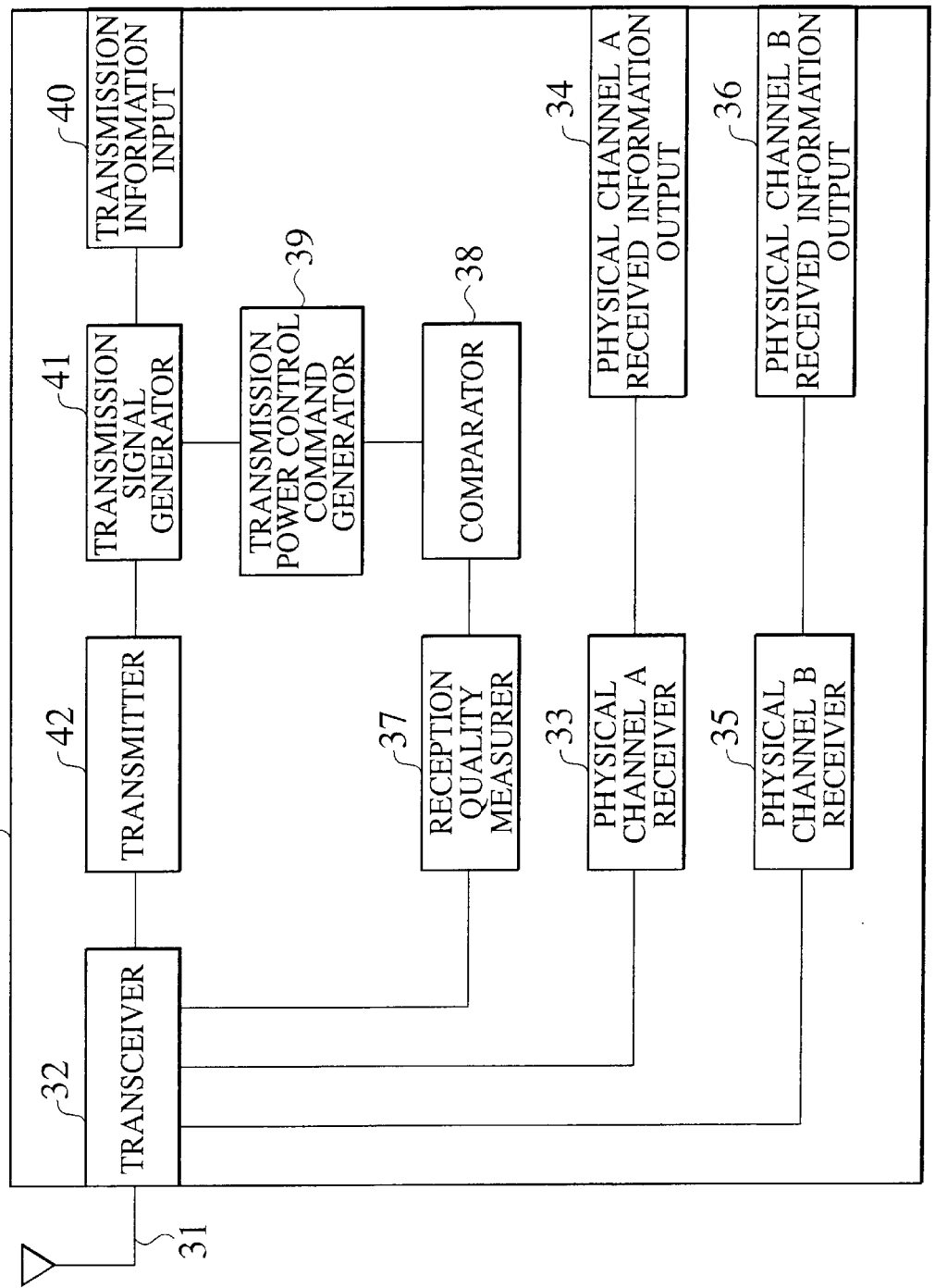
FIG. 4 is a schematic configuration diagram of a mobile station according to an embodiment of the present invention.

FIG. 4 is a diagram showing a schematic configuration of a mobile station $30_2$ according to the present embodiment. In the present embodiment, the mobile station $30_2$ is receiving "physical channels A (DCHs)", i.e., "a first signal and a third signal" respectively from a base station $10_1$ and a base station $10_2$, and simultaneously receiving a "physical channel B (SCH)", i.e., a "second signal" only from the base station $10_1$. Propagation levels of signals from the base station $10_1$ and the base station $10_2$ are varied violently by mutually independent fading phenomena.

When the mobile station $30_2$ according to the present embodiment is conducting DHO between the base station $10_1$ and the base station $10_2$ using the "physical channels A (DCHs)", a mobile communication system including the mobile station $30_2$ conducts a transmission power control on both the "physical channel A (DCH)" and the "physical channel B (SCH)" in a down direction (a direction directed from the base station 10 to the mobile station 30).

The mobile station $30_2$ is formed of, for example, a portable telephone terminal, a PDA terminal, or the like. In the present embodiment, mobile stations $30_1$ to $30_5$ have the same configuration. In the ensuing description, therefore, the mobile station $30_2$ is handled as a representative station.

During a diversity handover (DHO), the mobile station $30_2$ receives signals ("physical channels A (DCHs)" and "physical channel B (SCH)") from a first base station $10_1$ and a second base station $10_2$.

To be more concrete, the mobile station $30_2$ includes a radio antenna 31, a transceiver 32, a physical channel A receiver 33, a physical channel A received information output 34, a physical channel B receiver 35, a physical channel B received information output 36, a reception quality measurer 37, a comparator 38, a transmission power control command generator 39, a transmission information input 40, a transmission signal generator 41, and a transmitter 42, as shown in FIG. 4.

In the present embodiment, the transceiver 32 forms a receiver configured to receive a first signal ("physical channel A (DCH)") and a second signal ("physical channel B (SCH)") from the first base station $10_1$ and receiving a third signal ("physical channel A (DCH)") from the second base station $10_2$.

The reception quality measurer 37 forms a reception quality measurer configured to measure the reception quality of the first signal ("physical channel A (DCH)") or the second signal ("physical channel B (SCH)").

The transmission power control command generator 39 forms a control command generator configured to generate a control command (transmission power control command) in order to control the transmission power of a signal from the first base station $10_1$ and the second base station $10_2$ on the basis of a measurement result of reception quality.

The transceiver 32, the transmission signal generator 41, and the transmitter 42 form a transmitter configured to transmit the control command (transmission power control command) to the first base station $10_1$ and the second base station $10_2$.

The transceiver 32 is connected to the radio antenna 31, the physical channel A receiver 33, the physical channel B receiver 35, the reception quality measurer 37, and the transmitter 42. The transceiver 32 has a function of transmitting a transmission signal transmitted from the transmitter 42 via the radio antenna 31. Furthermore, the transceiver 32 has a function of transferring a received signal received via the radio antenna 31 to the physical channel A receiver 33 or the physical channel B receiver 35, and the reception quality measurer 37.

In the present embodiment, the transceiver 32 receives the "physical channel A (DCH)" and the "physical channel B (SCH)" from the base station $10_1$ and receives the "physical channel A (DCH)" from the base station $10_2$.

The physical channel A receiver 33 is connected to the transceiver 32 and the physical channel A received information output 34. The physical channel A receiver 33 conducts a diversity combination on the "physical channels A (DCHs)" from the base station $10_1$ and the base station $10_2$ transferred from the transceiver 32.

The physical channel A receiver 33 conducts reception processing, such as despreading, demodulation and decoding, on the diversity-combined "physical channel A (DCH)", and reproduces the "physical channel A received information" transmitted on the physical channel A.

Furthermore, the physical channel A receiver 33 transmits the reproduced "physical channel A received information" to the physical channel A received information output 34. Herein, the "physical channel A received information" is, for example, audio information, data contents information, and control information.

The physical channel A received information output 34 is connected to the physical channel A receiver 33, and outputs physical channel A received information transmitted from the physical channel A receiver 33. If the physical channel A received information is audio information, the physical channel A received information output 34 outputs it via a speaker. If the physical channel A received information is data contents information, the physical channel A received information output 34 displays it via a display.

The physical channel B receiver 35 is connected to the transceiver 32 and the physical channel B received information output 36. The physical channel B receiver 35 conducts reception processing, such as despreading, demodulation and decoding, on the "physical channel B (SCH)" from the base station 10 transferred from the transceiver 32, and reproduces the "physical channel B received information" transmitted on the physical channel B.

Furthermore, the physical channel B receiver 35 transmits the reproduced "physical channel B received information" to the physical channel B received information output 36. Herein, the "physical channel B received information" is, for example, audio information, data contents information, and control information.

If the "physical channel B (SCH)" is transmitted from a plurality of base stations 10, such as the base station $10_1$ and the base station $10_2$, then the physical channel B receiver 35 may conduct a diversity combination on a plurality of received "physical channels B (SCHs)" and conduct reception processing on the diversity-combined "physical channel B (SCH)".

The reception quality measurer 37 is connected to the transceiver 32 and the comparator 38. The reception quality measurer 37 measures the reception quality in the mobile station $10_2$ using only the "physical channel A (DCH)" or the "physical channel B (SCH)" from the base station $10_1$ transferred from the transceiver 32.

As the measured reception quality, the "signal to interference power ratio (SIR), the "reception power", and the "result of error detection using the CRC" can be mentioned. Furthermore, the reception quality measurer 37 transmits the measured reception quality to the comparator 38.

In the present embodiment, the "physical channel B (SCH)" is transmitted only from the base station $10_1$. However, the application range of the present invention is not restricted to this. For example, if the "physical channel B (SCH)" is transmitted from a plurality of base stations $10_1$ to $10_5$ and the "physical channel A (DCH)" is transmitted from a plurality of base stations $10_1$ to $10_5$, then it is also possible for the reception quality measurer 37 to conduct a diversity combination on the "physical channels A (DCHs)" from the base stations $10_1$ to $10_5$ transferred from the transceiver 32 and measure the reception quality in the mobile station $10_2$ using the diversity-combined "physical channel A (DCH)".

The comparator 38 is connected to the reception quality measurer 37 and the transmission power control command generator 39. The comparator 38 compares the reception quality transmitted from the reception quality measurer 37 with a predetermined desired value, and transmits a result of the comparison to the transmission power control command generator 39.

The transmission power control command generator 39 is connected to the comparator 38 and the transmission signal generator 41. According to the comparison result transmitted from the comparator 38, the transmission power control command generator 39 generates the "transmission power control command" for controlling the transmission power of the "physical channel A (DCH)" and the "physical channel B (SCH)" of the base station $10_1$ and the transmission power of the "physical channel A (DCH)" of the base station $10_2$. The transmission power control command generator 39 transmits the generated "transmission power control command" to the transmission signal generator 41.

For example, if the reception quality (reception power) of the "physical channel A (DCH)" is less than the desired value for the comparison result, then the "transmission power control command" gives an order for the transmission power of the "physical channels A (DCHs)" of the base station $10_1$ and the base station $10_2$ to be increased.

On the other hand, if the reception quality (reception power) of the "physical channel A (DCH)" is greater than the desired value for the comparison result, then the "transmission power control command" gives an order for the transmission power of the "physical channels A (DCHs)" of the base station $10_1$ and the base station $10_2$ to be decreased.

The transmission information input 40 is connected to the transmission signal generator 41. The transmission information input 40 transfers transmission information input by the user to the transmission signal generator 41. The transmission information input 40 is formed of, for example, push buttons and a touch panel type display.

The transmission signal generator 41 is connected to the transmission power control command generator 39, the transmission information input 40, and the transmitter 42. The transmission signal generator 41 generates a transmission signal by multiplexing the transmission power control command transmitted from the transmission power control command generator 39 and the transmission information (of the up direction) transferred from the transmission information input 40, and transmits the generated transmission signal to the transmitter 42.

The transmitter 42 is connected to the transceiver 32 and the transmission signal generator 41. The transmitter 42 conducts transmission processing, such as coding, modulation and spreading, on the transmission signal transmitted from the transmission signal generator 41, and transmits the transmission signal subjected to the transmission processing to the transceiver 32.

(Operation of Mobile Station According to First Embodiment of Present Invention)

Operation of the mobile station $30_2$ having the above described configuration will now be described with reference to FIG. 5.

FIG. 5 is a flow chart showing operation conducted when a mobile communication system including a mobile station $30_2$ effects transmission power control on the "physical channel A (DCH)" and the "physical channel B (SCH)" in the down direction when the mobile station $30_2$ according to the present embodiment is conducting DHO between the base station $10_1$ and the base station $10_2$ using the "physical channel A (DCH)".

As shown in FIG. 5, the transceiver 32 receives a "physical channel A (DCH)" and a "physical channel B (SCH)" from the base station $10_1$ via the radio antenna 31 and receives a "physical channel A (DCH)" from the base station $10_2$ via the radio antenna 31 at step 301. The transceiver 32 transfers the received "physical channels A (DCHs)" and "physical channel B (SCH)" to the physical channel A receiver 33, the physical channel B receiver 35, and the reception quality measurer 37.

At step 302, the physical channel A receiver 33 conducts reception processing, such as despreading, demodulation, and decoding, on the "physical channel A (DCH)" from the base station $10_1$ or the base station $10_2$ transferred from the transceiver 32, reproduces "physical channel A received information" transmitted on the physical channel A, and transmits the "physical channel A received information" thus reproduced to the physical channel A received information output 34.

Furthermore, the physical channel B receiver 35 conducts reception processing, such as despreading, demodulation, and decoding, on the "physical channel B (DCH)" from the base station $10_1$ transferred from the transceiver 32, reproduces "physical channel B received information" transmitted on the physical channel B, and transmits the "physical channel B received information" thus reproduced to the physical channel B received information output 36.

At step 303, the physical channel A received information output 34 outputs the "physical channel A received information" transmitted from the physical channel A receiver 33. Furthermore, the physical channel B received information output 36 outputs the "physical channel B received information" transmitted from the physical channel B receiver 35.

At step 304, the reception quality measurer 37 measures the reception quality in the mobile station $30_2$ using only the "physical channel A (DCH)" or the "physical channel B (SCH)" from the base station $10_1$ transferred from the transceiver 32, and transmits the measured reception quality to the comparator 38.

At step 305, the comparator 38 compares the reception quality transmitted from the reception quality measurer 37 with a predetermined desired value, and transmits a result of the comparison to the transmission power control command generator 39.

At step 306, the transmission power control command generator 39 generates a "transmission power control command" for controlling the transmission power of the "physical channel A (DCH)" and the "physical channel B (SCH)" to the base station $10_1$ and the transmission power of the "physical channel A (DCH)" to the base station $10_2$ on the basis of the comparison result transmitted from the comparator 38, and transmits the generated "transmission power control command" to the transmission signal generator 41.

At step 307, the transmission information input 40 transfers transmission information input by the user to the transmission signal generator 41.

At step 308, the transmission signal generator 41 generates a transmission signal by multiplexing the transmission power control command transmitted from the transmission power control command generator 39 and the transmission information (of the up direction) transferred from the transmission information input 40, and transmits the generated transmission signal to the transmitter 42.

At step 309, the transmitter 42 conducts transmission processing, such as coding, modulation and spreading, on the transmission signal transmitted from the transmission signal generator 41, and transmits the transmission signal subjected to the transmission processing to the transceiver 32.

At step 310, the transceiver 32 transmits the transmission signal transmitted from the transmitter 42 via the radio antenna 31.

FIG. 6 shows how the mobile station $30_2$ controls the transmission power of the "physical channel A (DCH)" and "physical channel B (SCH)" transmitted from the base station $10_1$ and the transmission power of the "physical channel A (DCH)" transmitted from the base station $10_2$. The propagation level of signals from the base station $10_1$ (FIG. 6A) and the propagation level of signals from the base station $10_2$ (FIG. 6B) are varied by respective independent fading phenomena.

In FIG. 6C, the transmission power of the "physical channel A (DCH)" transmitted from the base station $10_1$ to the mobile station $30_2$ is indicated by a solid line, whereas the transmission power of the "physical channel B (SCH)" transmitted from the base station $10_1$ to the mobile station $30_2$ is indicated by a broken line. In FIG. 6D, the transmission power of the "physical channel A (DCH)" transmitted from the base station $10_2$ to the mobile station $30_2$ is indicated by a solid line.

Unlike the conventional technique in which the reception quality of a signal obtained by conducting diversity a combination on the "physical channels A (DCHs)" of the base station $10_1$ belonging to the base station group B and the base station $10_2$ belonging to the base station group A, is measured, the mobile station $30_2$ measures the reception quality of the signal ("physical channel A (DCH)") from the base station $10_1$ as described above. On the basis of a result of the measurement, the mobile station $30_2$ conducts transmission power control on the "physical channels A (DCHs)" of the base station $10_1$ and the base station $10_2$.

As shown in FIG. 6E, therefore, the reception quality (indicated by a dotted line in FIG. 6E) of the "physical channel A (DCH)" from the base station $10_1$ becomes constant at a predetermined desired value. The transmission power of the "physical channel A (DCH)" of the base station $10_1$ thus compensates for the variation in the propagation level of signals from the base station $10_1$.

Furthermore, the transmission power of the "physical channel B (SCH)" is controlled so as to be linked with the transmission power of the "physical channel A (DCH)" of the base station $10_1$ (see FIG. 6C).

Therefore, the reception quality (indicated by a broken line in FIG. 6E) of the "physical channel B (SCH)" in the mobile station $30_2$ coincides with a predetermined desired value and becomes constant.

The transmission power of the "physical channel A (DCH)" of the base station $10_2$ is controlled in the same way as the transmission power of the "physical channel A (DCH)" of the base station $10_1$. In actual data reception, therefore, the mobile station $30_2$ may conduct a diversity combination on the "physical channels A (DCHs)" of the two base stations $10_1$ and $10_2$ (as indicated by a solid line in FIG. 6E).

In other words, it is possible to utilize only the "physical channel A (DCHs)" from the base station $10_1$ in the reception quality measurement for transmission power control and conduct a diversity combination on the "physical channels A (DCHs)" of the base station $10_1$ and the base station $10_2$ in actual data reception.

When the diversity combination is conducted in data reception, the reception quality of the physical channel always exceeds the predetermined desired valued. Furthermore, the handover causes no interruption, and stable communication can be maintained.

(Action and Effect Obtained by Mobile Station According to the First Embodiment)

In the mobile station $30_2$ according to the present embodiment, the transmission power of the "physical channel B (SCH)" in the base station $10_1$ is controlled on the basis of only the measurement result of the reception quality of the "physical channel A (DCH)" or the "physical channel B (SCH)" (which are not subjected to a diversity combination). Even when the mobile station $30_2$ is conducting DHO using the "physical channel A (DCH)", the reception quality of the "physical channel B (SCH)" can be prevented from being degraded.

Furthermore, in the mobile station $30_2$ according to the present embodiment, the problem that the transmission power in the base station $10_1$ becomes excessive for the above described reason and the power utilization efficiency is lowered thereby can be solved.

Furthermore, in the mobile station $30_2$ according to the present embodiment, the problem that the transmission power in the base station $10_1$ becomes excessive for the above described reason and that it increases the interference and lowers the efficiency of the whole mobile communication system can be solved.

(Configuration of Mobile Station According to the Second Embodiment)

A configuration of a mobile station $30_2$ according to a second embodiment of the present invention will now be described with reference to the drawings. FIG. 7 is a diagram showing a schematic configuration of a mobile station $30_2$ according to the present embodiment.

In the present embodiment, the mobile station $30_2$ receives "physical channels A (DCHs)", i.e., "a first signal and a third signal" respectively from a base station $10_1$ and a base station $10_2$, and simultaneously receives a "physical channel B (SCH)", i.e., a "second signal" only from the base station $10_1$.

As an example, the "physical channel B" is a shared channel "SCH" whereby a plurality of mobile stations $30_1$ to $30_5$ transmit packets in a time division multiplex form, and the "physical channel A" is a "DCH" for "signaling (notice)" that indicates that there is a packet being directed to the mobile stations $30_1$ to $30_5$ on the "physical channel B (SCH)".

In other words, the mobile station $30_2$ is in the DHO state between the base station $10_1$ and the base station $10_2$. The mobile station $30_2$ receives "physical channels A (DCHs)" from two base stations $10_1$ and $10_2$. At the same time, the mobile station $30_2$ receives the "physical channel B (SCH)" from only the base station $10_1$ intermittently. Propagation levels of signals from the base station $10_1$ and the base station $10_2$ are varied violently by mutually independent fading phenomena.

In the mobile communication system, the mobile station $30_2$ according to the present embodiment conducts transmission power control on both the "physical channels A (DCHs)" and the "physical channel B (SCH)" in the down direction when the mobile station $30_2$ is conducting DHO between the base station $10_1$ and the base station $10_2$ using the "physical channels A (DCHs)".

The mobile station $30_2$ according to the present embodiment has the same basic configuration as the mobile station $30_2$ according to the first embodiment does except that a control circuit 43 connected to the physical channel A receiver 33, the physical channel B receiver 35 and the reception quality measurer 37 is provided and the physical channel A received information output 34 is removed.

In the present embodiment, the control circuit 43 forms monitor configured to effect monitoring on a first signal ("physical channel A (DCH)") to determine whether signaling is occurring as notification that a second signal ("physical channel B (SCH)") is being transmitted to the mobile station $30_2$.

Since the "physical channel A" is defined as "DCH" for "signaling (notice)", the mobile station $30_2$ according to the present embodiment has been supposed not to have the physical channel A received information output 34. Of course, however, the mobile station $30_2$ according to the present embodiment may have the physical channel A received information output 34.

The control circuit 43 monitors the physical channel A receiver 33 to determine whether signaling is occurring on the "physical channel A (DCH)". If signaling is sensed, then the control circuit 43 starts reception processing on the "physical channel B (SCH)" by activating the physical channel B receiver 33.

When the control circuit 43 senses signaling in the physical channel A receiver 33, the control circuit 43 orders the reception quality measurer 37 to measure the reception quality of the "physical channel A (DCH)" or the "physical channel B (SCH)" from the base station $10_1$ that transmits the "physical channel B (SCH)".

When the reception processing of the "physical channel B (SCH)" conducted by the physical channel B receiver 35 finishes and a return to the "physical channel B (SCH)" waiting state is effected, the control circuit 43 orders the reception quality measurer 37 to conduct a diversity combination on "physical channels A (DCHs)" from all base stations $10_1$ and $10_2$ transmitting "physical channels A (DCHs)" and to measure the reception quality obtained after the diversity combination.

In the case of a mobile communication system, such as a CDMA system, capable of conducting RAKE combination, the reception quality measurer 37 conducts the RAKE combination. In this case, the reception quality measurer 37 can measure the reception quality according to the order of the control circuit 43 (according to whether the physical channel B (SCH) is being received) by suitably switching fingers in the RAKE combination.

(Operation of Mobile Station According to the Second Embodiment of Present Invention)

Operation of the mobile station $30_2$ having the above described configuration will now be described with reference to FIG. 8.

FIG. 8 is a flow chart showing operation conducted when transmission power control is effected on the "physical channel A (DCH)" and the "physical channel B (SCH)" in the down direction when the mobile station $30_2$ according to the present embodiment is conducting DHO between the base station $10_1$ and the base station $10_2$ using the "physical channel A (DCH)".

Only operations that differ from that of the mobile station $30_2$ according to the first embodiment of the present invention will now be described.

As shown in FIG. 8, the transceiver 32 receives a "physical channel A (DCH)" and a "physical channel B (SCH)" from the base station $10_1$ via the radio antenna 31 and receives a "physical channel A (DCH)" from the base station $10_2$ via the radio antenna 31 at step 601. The transceiver 32 transfers the received "physical channels A (DCHs)" and "physical channel B (SCH)" to the physical channel A receiver 33, the physical channel B receiver 35, and the reception quality measurer 37.

At step 602, the control circuit 43 monitors the physical channel A receiver 33 to determine whether signaling is occurring on the "physical channel A (DCH)". In the initial state, the reception quality measurer 37 conducts a diversity combination on "physical channels A (DCHs)" from all the base stations 10 and $10_2$ transmitting the "physical channel A (DCH)", and measures the reception quality obtained after the diversity combination.

At step 603, if the control circuit 43 has sensed signaling on the "physical channel A (DCH)" in the physical channel A receiver 33 ("YES" of the step 603), then the control circuit 43 starts reception processing on the "physical channel B (SCH)" by activating the physical channel B receiver 35.

If the control circuit 43 has sensed signaling in the physical channel A receiver 33 ("YES" of the step 603), then the control circuit 43 simultaneously orders the reception quality measurer 37 to measure the reception quality of the "physical channel A (DCH)" or the "physical channel B (SCH)" from the base station $10_1$, which transmits the "physical channel B (SCH)". And the operation of the mobile station $30_2$ according to the present embodiment proceeds to step 604.

On the other hand, at step 603, if the control circuit 43 has not sensed signaling in the physical channel A receiver 33 ("NO" of the step 603), then the control circuit 43 returns to step 602.

At step 604, the reception quality measurer 37 changes over the reception quality measuring method according to the order received from the control circuit 43. In other words, the reception quality measurer 37 measures the reception quality of the "physical channel A (DCH)" or the "physical channel B (SCH)" from the base station $10_1$, which transmits the "physical channel B (SCH)".

At step 605, the control circuit 43 monitors the situation of the reception processing of the "physical channel B (SCH)", which is being conducted by the physical channel B receiver 35.

At step 606, if the control circuit 43 detects that the reception processing of the "physical channel B (SCH)" conducted by the physical channel B receiver 35 has finished ("YES" of the step 606), then the control circuit 43 orders the reception quality measurer 37 to conduct a diversity combination on the "physical channels A (DCHs)" from all base stations $10_1$ and $10_2$ transmitting the "physical channel A (DCH)" and measure the reception quality obtained after the diversity combination.

The operation of the mobile station $30_2$ according to the present embodiment proceeds to step 607.

On the other hand, at step 606, if the control circuit 43 does not detect that the reception processing of the "physical channel B (SCH)" conducted by the physical channel B receiver 35 has finished ("NO" of the step 606), then the operation returns to the step 605.

At step 607, the reception quality measurer 37 changes the reception quality measuring method according to the order from the control circuit 43. In other words, the reception quality measurer 37 conducts a diversity combination on the "physical channels A (DCHs)" from all base stations $10_1$ and $10_2$ transmitting the "physical channel A (DCH)" and measures the reception quality obtained after the diversity combination.

FIG. 9 shows how the mobile station $30_2$ controls the transmission power of the "physical channel A (DCH)" and "physical channel B (SCH)" transmitted from the base station $10_1$ and the transmission power of the "physical channel A (DCH)" transmitted from the base station $10_2$. The propagation level of signals from the base station $10_1$ (FIG. 9(A)) and the propagation level of signals from the base station $10_2$ (FIG. 9(B)) are varied by respective independent fading phenomena.

In FIG. 9(C), the transmission power of the "physical channel B (SCH)" transmitted intermittently from the base station $10_1$ to the mobile station $30_2$ is drawn. Since the "physical channel B (SCH)" is a shared channel shared by a plurality of mobile stations $10_1$ to $10_5$ in a time division multiplex form, the transmission power thus becomes intermittent.

In FIG. 9(D), the transmission power of the "physical channel A (DCH)" transmitted from the base station $10_1$ to the mobile station $30_2$ is indicated by a solid line, whereas the transmission power of the "physical channel B (SCH)" transmitted from the base station $10_1$ to the mobile station $30_2$ is indicated by a broken line.

Throughout an interval T2 during which the mobile station $30_2$ receives the "physical channel B (SCH)", the mobile station $30_2$ measures the reception quality ("reception SIR") using only a signal from the base station $10_1$ ("physical channel A (DCH)") and conducts transmission power control on the basis of a result of the measurement ("reception SIR") (thick solid portions in FIGS. 9(D) and (F)).

Throughout an interval T1 during which the mobile station $30_2$ does not receive the "physical channel B (SCH)", the mobile station $30_2$ conducts a diversity combination on the ("physical channels A (DCHs)") of both the base station $10_1$ and the base station $10_2$, measures the reception quality ("reception SIR") obtained after the diversity combination, and conducts transmission power control on the basis of a result of the measurement ("reception SIR") (thin solid portions in FIGS. 9(D) and (F)).

In this way, the mobile station $30_2$ changes over the measurement subject of the reception quality ("reception SIR") between the "physical channel A (DCH)" of the base station $10_1$ and the "physical channel A (DCH)" obtained by conducting the a diversity combination on the ("physical channels A (DCHs)") of the base station $10_1$ and the base station $10_2$, according to whether the "physical channel B (SCH)" is being received.

At this time, the base station $10_1$ controls the transmission power of the "physical channel B (SCH)" so as to link it with the transmission power of the "physical channel A (DCH)" of the base station $10_1$, as shown in FIG. 9(d).

In a mobile communication system capable of effecting RAKE reception, the above described changeover can be implemented simply by switching fingers in the RAKE reception. In other words, RAKE combination is conducted in the reception quality measurement, and switching is controlled so as to assign fingers to only signals of the base station $10_1$ transmitting the "physical channel B (SCH)" throughout the interval T2 during which the mobile station $30_2$ receives the "physical channel B (SCH)", and assign fingers to signals from all the base stations $10_1$ and $10_2$ forming the DHO throughout the interval T1 during which the mobile station $30_2$ does not receive the "physical channel B (SCH)".

In FIG. 9(E), the transmission power of the "physical channel A (DCH)" transmitted from the base station $10_2$ to the mobile station $30_2$ is indicated by a solid line. In the same way as the transmission power control is conducted on the "physical channel A (DCH)" transmitted from the base station $10_1$ to the mobile station $30_2$, the mobile station $30_2$ conducts transmission power control on the "physical channel A (DCH)" transmitted from the base station $10_2$ to the mobile station $30_2$.

In FIG. 9(f), a reception SIR of the "physical channel A (DCH)" transmitted from the base station $10_1$ to the mobile station $30_2$, a reception SIR of the "physical channel B (SCH)" transmitted from the base station $10_1$ to the mobile station $30_2$, and a reception SIR obtained by conducting the diversity combination on the "physical channels A (DCHs)" transmitted from the base station $10_1$ and the base station $10_2$ to the mobile station $30_2$ are shown.

During the interval T2, the reception SIR of the "physical channel B (SCH)" is constant, and quality degradation of the "physical channel B (SCH)" can be avoided (a broken line portion of FIG. 9(f)).

During the interval T1, the reception SIR obtained by conducting the diversity combination on the "physical channels A (DCHs)" transmitted from the base station $10_1$ and the base station $10_2$ to the mobile station $30_2$ is constant, and quality degradation of the "physical channel A (DCH)" can be avoided (a thin solid line portion of FIG. 9(f)).

During the interval T2, the reception SIR of the "physical channel A (DCH)" becomes greater than is needed and the transmission power of the "physical channel A (DCH)" becomes excessively great in some cases (thick solid line portion of FIG. 9(f)). However, this phenomenon occurs only for the limited mobile station $30_2$ that is receiving the "physical channel A (DCH)". Therefore, the fatal problem that the quality of the "physical channel B (SCH)" is degraded in the conventional technique is solved.

A dotted line portion indicates the reception SIR of the "physical channel A (DCH)" transmitted from the base station $10_1$ to the mobile station $30_2$ in the interval T1.

As the transmission of the "physical channel B (SCH)" is signaled by the "physical channel A (DCH)" in the present embodiment, the measurement subject of the reception quality (reception SIR) should change when signaling on the "physical channel A (DCH)" is being received.

Also in a mobile communication system in which signaling is conducted using a different shared channel instead of the "physical channel A (DCH)", the measurement subject of reception quality (reception SIR) should change over when signaling is being received.

Irrespective of the signaling method, therefore, the present invention can be applied. In any case, similar effects can be obtained.

(Action and Effect Obtained by Mobile Station According to the Second Embodiment)

In the mobile station $30_2$ according to the present embodiment, the transmission power of the "physical channel A (DCH)" and the "physical channel B (SCH)" in the base station $10_1$ and the base station $10_2$ is controlled on the basis of the measurement result of the reception quality of the signal obtained by conducting a diversity combination on the "physical channels A (DCHs)" throughout the interval T2 during which the "physical channel B (SCH)" is not being received. As a result, the transmission power in the interval T2 during which the "physical channel B (SCH)" is not received can be made appropriate.

Furthermore, in the mobile station $30_2$ according to the present embodiment, only one system of the reception quality measurer 37 is needed in the same way as the conventional technique. Without greatly increasing the apparatus scale, therefore, great effects such as quality degradation prevention and transmission power reduction can be obtained with extremely simple control.

As heretofore described, according to the present invention, it is possible to provide a transmission power control method that prevents communication quality degradation of the "physical channel A (DCH)" and the "physical channel B (SCH)" using simple controls without a great alteration of the apparatus scale, by when the base station group $10_1$ transmitting the "physical channel B (SCH)" is a subset of the base station group $10_1$ to $10_5$ transmitting the "physical channels A (DCHs)", but when the base station group $10_1$ does not coincide with the base station group $10_1$ to $10_5$ and the mobile station $30_2$, conducting DHO using the "physical channels A (DCHs)", and to provide a mobile station suitable for the transmission power control method.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A transmission power control method for controlling, in a mobile station receiving signals from a first base station and a second base station during a diversity handover, the transmission power of the signals from the first base station and the second base station, said transmission power control method comprising the steps:

a) receiving a first signal and a second signal from the first base station and receiving a third signal from the second base station;

b) measuring a reception quality of the first signal or the second signal;

c) generating a control command for controlling the transmission power of the signals from the first base station and the second base station on the basis of a result of the measurement of the reception quality; and d) transmitting the control command to the first base station and the second base station.

2. The transmission power control method according to claim 1, wherein in said step a), the second signal is received intermittently, and in said step b), the reception quality of the first signal or the second signal is measured in an interval during which the second signal is being received, whereas a reception quality of a signal obtained by conducting a diversity combination on the first signal and the third signal is measured in an interval during which the second signal is not being received.

3. The transmission power control method according to claim 2, comprising a step of:

e) monitoring the first signal to determine whether signaling is occurring to notify the mobile station that the second signal is being transmitted, wherein, in said step b), it is determined whether an interval is the interval during which the second signal is being received, according to whether the signaling is occurring.

4. The transmission power control method according to claim 2, wherein, in said step b) the reception quality is measured with RAKE reception by switching between a finger assignment to the first signal or the second signal and a finger assignment to the first signal and the third signal, according to whether an interval is the interval during which the second signal is being received.

5. The transmission power control method according to claim 1, wherein the first signal and the third signal are dedicated channels (DCHs) provided for each mobile station, whereas the second signal is a shared channel (SCH) shared by a plurality of mobile stations in a time division form.

6. A mobile station for receiving signals from a first base station and a second base station during a diversity handover, said mobile station comprising:

a receiver configured to receive a first signal and a second signal from the first base station and receive a third signal from the second base station;

a reception quality measurer configured to measure a reception quality of the first signal or the second signal;

a control command generator configured to generate a control command for controlling the transmission power of the signals from the first base station and the second base station on the basis of a result of the measurement of reception quality; and a transmitter configured to transmit the control command to the first base station and the second base station.

7. The mobile station according to claim 6, wherein said receiver receives the second signal intermittently, and said reception quality measurer measures the reception quality of the first signal or the second signal in an interval during which the second signal is being received, whereas said reception quality measurer measures a reception quality of a signal obtained by conducting a diversity combination on the first signal and the third signal in an interval during which the second signal is not being received.

8. The mobile station according to claim 7, comprising:

a monitor configured to monitor the first signal to determine whether signaling is occurring to notify the mobile station that the second signal is being transmitted, wherein said reception quality measurer determines whether an interval is the interval during which the second signal is being received, according to whether the signaling is occurring.

9. The mobile station according to claim 7, wherein said reception quality measurer measures the reception quality with RAKE reception by switching between a finger assignment to the first signal or the second signal and a finger assignment to the first signal and the third signal, according to whether an interval is the interval during which the second signal is being received.

10. The mobile station according to claim 6, wherein the first signal and the third signal are dedicated channels (DCHs) provided for each mobile station, whereas the second signal is a shared channel (SCH) shared by a plurality of mobile stations in a time division form.

* * * * *